(No Model.)
L. A. POWERS.
DUST PAN.
No. 518,273. Patented Apr. 17, 1894.
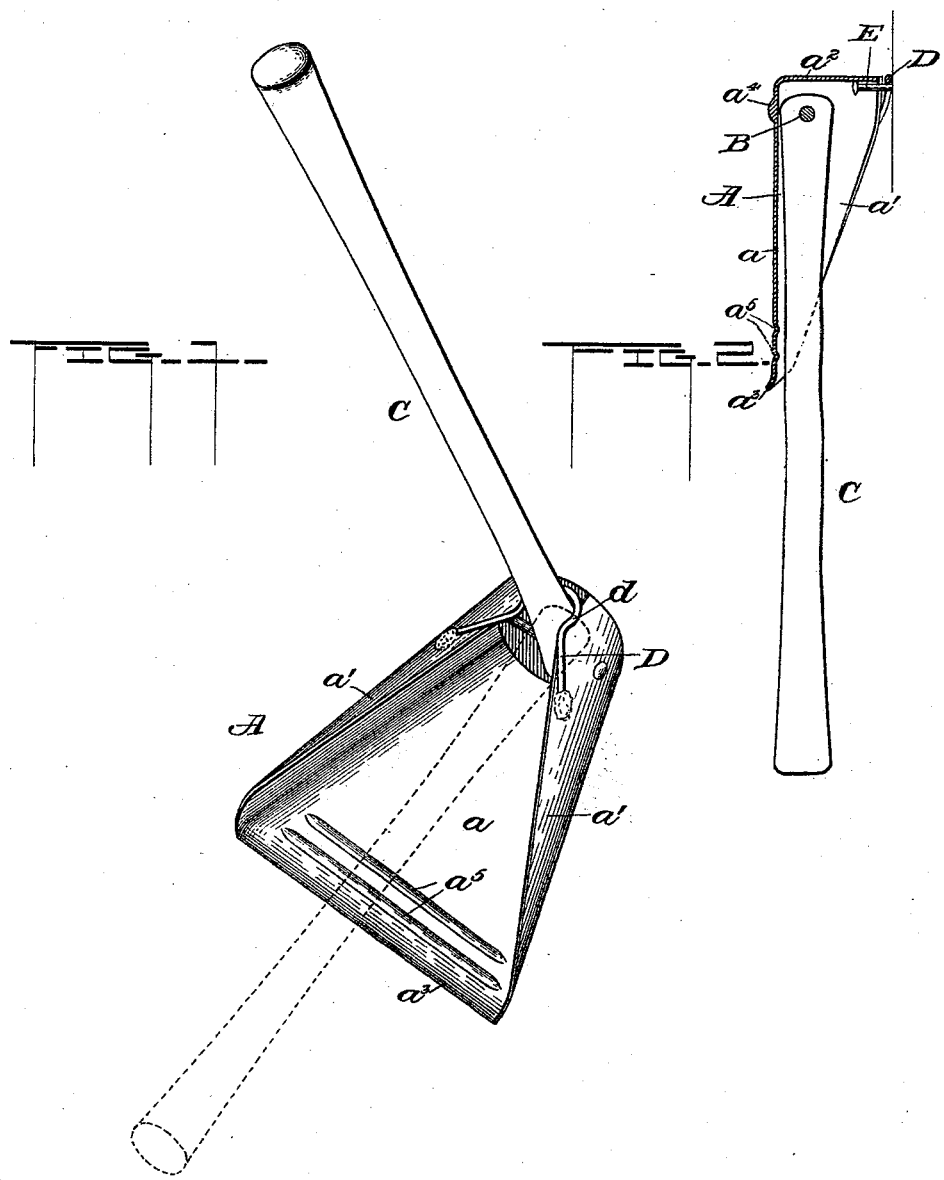
Witnesses:
C. W. Smith
W. H. Bentley
Inventor.
Lyman A. Powers
By G. W. Whinery
Attorney.

UNITED STATES PATENT OFFICE.

LYMAN A. POWERS, OF FENNIMORE, WISCONSIN, ASSIGNOR OF ONE-HALF TO HENRY E. ROETHE, OF SAME PLACE.

DUST-PAN.

SPECIFICATION forming part of Letters Patent No. 518,273, dated April 17, 1894.

Application filed February 3, 1894. Serial No. 499,000. (No model.)

*To all whom it may concern:*

Be it known that I, LYMAN A. POWERS, a citizen of the United States, residing at Fennimore, in the county of Grant and State of Wisconsin, have invented certain new and useful Improvements in Dust-Pans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to dust pans, and has for its objects, to enable a person to use the pan without stooping, to so form the side of the pan as to facilitate emptying its contents, and to enable the handle to be turned down so that the pan can be readily packed or hung up when not in use.

In the drawings Figure 1 is a perspective view of my improved dust pan as it appears when ready to be used. Fig. 2 shows the handle folded down and the article hung on a nail, the pan being shown in section.

The pan A is formed preferably in one piece, having a flat bottom $a$ merging by a curve into the rounded sides $a'$, whose upper edges converge more rapidly than the side lines of the bottom, so that at the rear of the pan the sides $a'$ are substantially semicircular in cross section, as clearly shown in Fig. 1. The sides also increase in height from the front to the rear, being there securely fastened to the upright back $a^2$, which may be in one piece with the bottom, and is preferably circular. The upper edges of the sides leave a narrow space between them where they join the back. With this construction the material swept into the pan collects at the rear end where the high inclosing sides hold it safely, while the pan is being moved about. When it is desired to empty the contents of the pan, it is turned on one edge, and the curved edge acts as a spout to direct the material into the ash barrel, stove, or other place where it is desired to deposit it. The front edge $a^3$ of the bottom $a$ is turned downward so that it lies closely on the carpet or floor, and this effect is assisted by the stud or foot $a^4$ under the back end of the pan, which serves to raise the bottom of the pan off the floor, so that it rests only on said stud and the front edge. Across the front end of the pan, a little to the rear of the edge $a^3$ are one or more corrugations $a^5$ parallel with the edge of the pan and serving to stiffen it at that point. At the rear end of the pan is a transverse pin or bar B supported at each end in the sides $a'$, and serving as a pivot for the handle C which is hinged thereon. The handle is long so that when turned up to a position substantially at right angles to the bottom of the pan, it will enable the pan to be used without stooping on the part of the operator. The handle is firmly supported against lateral strain by the adjacent edges of the sides $a'$, and in order to keep it from accidentally folding down upon the pan, a spring clip is provided. This is preferably a U-shaped wire D which spans the space between the upper rear edges of the sides $a'$, the ends of the wire being attached to said sides. The legs of the U-shaped wire are re-curved inwardly at $d$, the width between these curves $d$ being less than that of the handle, so as to pinch the handle and compel it to force them apart a little in order to let the handle pass by them and be received in the rounded bight of the clip, where it is securely held by the springing in again of the curves $d$. When the handle is turned down to the position shown in Fig. 2, the article can be conveniently packed for shipment, or it can be readily hung up by its back $a^2$ upon a nail or peg E, which enters the space between the sides $a'$.

I am aware that dust pans have been made with folding handles, and I do not claim such an article broadly; but What I do claim is—

1. A dust pan having converging sides leaving a narrow space between them at the rear end, a cross bar supported by said sides, a handle hinged on said bar, and adapted to be turned down upon the bottom of the pan, and to be raised to an upright position in the space between the sides, and a spring clip spanning said space and adapted to receive and hold the handle in its upright position, substantially as described.

2. A dust pan, comprising the pan A having the converging curved sides $a'$ and back $a^2$, the cross bar B supported in said sides in front of said back, the handle C hinged on said cross bar, and the U-shaped wire D having its legs attached to the sides $a'$, and containing the curves $d$, substantially as described.

In testimony whereof I affix my signature in presence of two witnesses.

LYMAN A. POWERS.

Witnesses:
 B. W. NIEHAUS,
 CHAS. A. NIEHAUS.